(12) United States Patent
Bruel

(10) Patent No.: US 6,891,990 B2
(45) Date of Patent: May 10, 2005

(54) OPTICAL DEVICE WITH INTEGRATED STRUCTURE AND WAVE DEVIATION

(75) Inventor: Michel Bruel, Veurey Voroize (FR)

(73) Assignee: Commissariat a l'Energie Atomique, Paris (FR)

(*) Notice: Subject to any disclaimer, the term of this patent is extended or adjusted under 35 U.S.C. 154(b) by 0 days.

(21) Appl. No.: 10/471,782

(22) PCT Filed: Mar. 12, 2002

(86) PCT No.: PCT/FR02/00880
§ 371 (c)(1),
(2), (4) Date: Aug. 16, 2004

(87) PCT Pub. No.: WO02/075430
PCT Pub. Date: Sep. 26, 2002

(65) Prior Publication Data
US 2004/0264844 A1 Dec. 30, 2004

(30) Foreign Application Priority Data
Mar. 15, 2001 (FR) ............................................. 01 03545

(51) Int. Cl.$^7$ ........................... G02B 6/35; G02B 26/08
(52) U.S. Cl. ............................. 385/17; 385/18; 385/19
(58) Field of Search ..................................... 385/16–23

(56) References Cited

U.S. PATENT DOCUMENTS

| | | | |
|---|---|---|---|
| 4,505,539 A | | 3/1985 | Auracher et al. |
| 5,699,462 A | | 12/1997 | Fouquet et al. |
| 5,978,527 A | | 11/1999 | Donald |
| 6,407,835 B1 | * | 6/2002 | Donald ....................... 398/141 |
| 6,408,112 B1 | * | 6/2002 | Bartels ......................... 385/16 |
| 6,493,482 B1 | * | 12/2002 | Al-hemyari et al. .......... 385/19 |

FOREIGN PATENT DOCUMENTS

| | | |
|---|---|---|
| EP | 0494763 | 7/1992 |
| EP | 0813088 | 12/1997 |
| JP | 04235496 | 8/1992 |
| WO | 9946624 | 9/1999 |

OTHER PUBLICATIONS

Inagaki, S., et al., "Self–Holding Optical Switch Using Optical Matrix Board," IEICE Transactions on Electronics, Institute of Electronics Information and Comm. Eng. Tokyo, JP, vol. E77–C, No. 10, Oct. 1, 1994, pp. 1553–1558.

* cited by examiner

*Primary Examiner*—Akm Enayet Ullah
*Assistant Examiner*—Jerry T Rahll
(74) *Attorney, Agent, or Firm*—Meyertons, Hood, Kivlin, Kowert & Goetzel, P.C.; Eric B. Meyertons

(57) ABSTRACT

The invention relates to an optical device with an integrated structure for transporting at least one optical wave. The inventive device comprises at least one primary optical guiding means and at least two secondary optical guiding means which cut through the primary guiding means at junctions; a channel which passes through said junctions; a fluid section which fills at least one portion of said channel and which comprises one segment of a primary fluid, which can reflect the optical wave to be transported, and, on either side of said segment, a secondary fluid through which the optical wave can pass; means for moving said fluid section so as to direct selectively the primary fluid segment through said junctions; the channel passes through said junctions in such a way that, when the primary fluid segment is disposed in a selected junction, the transported optical wave is deviated from the primary optical guiding means towards the corresponding secondary optical guiding means, or vice versa.

20 Claims, 4 Drawing Sheets

OPTICAL DEVICE WITH INTEGRATED STRUCTURE AND WAVE DEVIATION

The present invention relates to the field of devices of integrated structure for transporting optical waves, in which the optical waves are deflected selectively from inputs into outputs.

It is already known to produce deflection matrices comprising a multiplicity of input optical guides placed in parallel and a multiplicity of output optical guides placed in parallel that intersect the input optical guides orthogonally at junction regions.

It is also known to produce, in each junction region, a routing groove into which a liquid is introduced or from which a liquid is extracted, so as to deflect the optical wave or to let it through. This is in particular the case of patent U.S. Pat. No. 4,505,539 in which it is proposed to change the optical properties of the liquid introduced into each groove by the effect of a magnetic field, in patent U.S. Pat. No. 5,699,462 in which it is proposed to change the state of the liquid introduced into each groove by heating, and in patent EP-A-0 494 763 in which provision is made to deliver or remove the liquid by means of a robot that acts selectively on reservoirs.

The devices described in the above documents require a complete actuation system and control lines for each of the junction regions in such a way that they are very bulky and expensive and limit the possibilities of integration and of volume reduction that are increasingly being sought to achieve.

The object of the present invention is to propose a device of integrated structure tending in particular to reduce the abovementioned drawbacks.

The optical device of integrated structure for transporting at least one optical wave, forming the subject matter of the present invention comprises: at least one main optical guiding means and at least two secondary optical guiding means to intersect the main guiding means in junction regions; a routing groove that passes through said junction regions; a fluid section that fills at least one portion of said groove and comprises at least one segment of a main fluid capable of reflecting the optical wave to be transported; and means for moving said fluid section along said groove so that the segment of the main fluid is selectively placed astride said junction regions; said routing groove passing through said junction regions in such a way that, when the main segment of the fluid lies astride a selected junction region, the optical wave transported is deflected from the main optical guiding means into the corresponding secondary optical guiding means, or vice versa.

According to the invention, said fluid section comprises, at least on one side of said segment of the main fluid, at least one secondary fluid that fills a portion of said groove and is transparent to the optical wave to be transmitted, in such a way that when this secondary fluid lies astride a junction region, the optical wave transported by the corresponding main optical guiding means and/or the corresponding secondary optical guiding means passes through this junction region.

The optical device according to the invention may advantageously include at least one reservoir, into which one end of said groove runs, and means for varying the volume, the pressure and/or the temperature of this reservoir and thus for moving said fluid section along said groove.

The optical device according to the invention may advantageously include at least two reservoirs, into which the ends of said groove run respectively, and means for varying the volume, the pressure and/or the temperature of at least one of these reservoirs and thus for moving said fluid section along said groove.

According to the invention, said fluid section preferably comprises at least one secondary fluid that fills said reservoir or reservoirs and said groove as far as the segment of the main fluid, this secondary fluid being transparent to the optical wave to be transmitted.

According to a preferred embodiment of the invention, said groove extends so as to form a V with a rounded tip, the branches of which V pass through said junction regions.

The optical device according to the invention may advantageously comprise a multiplicity of main optical guiding means and a multiplicity of secondary optical guiding means that intersect the main guiding means at junction regions, constituting a matrix, a multiplicity of routing grooves that pass respectively through the junction regions of the main optical guiding means, a multiplicity of fluid sections that fill said grooves respectively, and a multiplicity of means for moving said fluid sections respectively, so that the segment of the main fluid of each section is selectively placed astride the corresponding junction regions.

According to a preferred embodiment of the invention, each groove extends so as to form successive Vs with alternately opposed rounded tips.

According to one illustrative example of the invention, those parts of said main optical guiding means and said secondary optical guiding means respectively, located on each side of said matrix, constitute, alternatively, means for transporting optical waves and means for transporting waves for detecting the position of said segments of the main fluid, whereas those parts of said secondary optical guiding means and said main optical guiding means respectively, located on either side of said matrix, constitute means for transporting optical waves and means for transporting waves for detecting the position of said segments of the main fluid, respectively.

According to the invention, said means for moving said fluid section may advantageously comprise at least one membrane and means for deforming this membrane.

According to the invention, said means for moving said fluid section may advantageously comprise means for heating at least one part of said fluid section.

According to one illustrative example of the invention, the device comprises a base layer carrying at least two layers, between which layers the transmission cores of said optical guiding means are formed, and a cover plate, said groove, or alternatively said groove and said reservoir or reservoirs, being formed between said base layer and said cover plate.

According to the invention, said cover plate preferably includes at least one membrane located above at least one reservoir.

According to one illustrative example of the invention, the device includes a support plate that carries means for deforming said membrane.

According to the invention, said main fluid preferably comprises a gas or a liquid, in particular a metallic liquid.

According to the invention, said secondary fluid preferably comprises a liquid.

According to the invention, a third fluid could advantageously at least partly fill said reservoir or reservoirs.

The present invention will be more clearly understood on studying an optical device of integrated structure, constituting a switch, described by way of non-limiting example and illustrated by the drawing in which.

Figure 1:
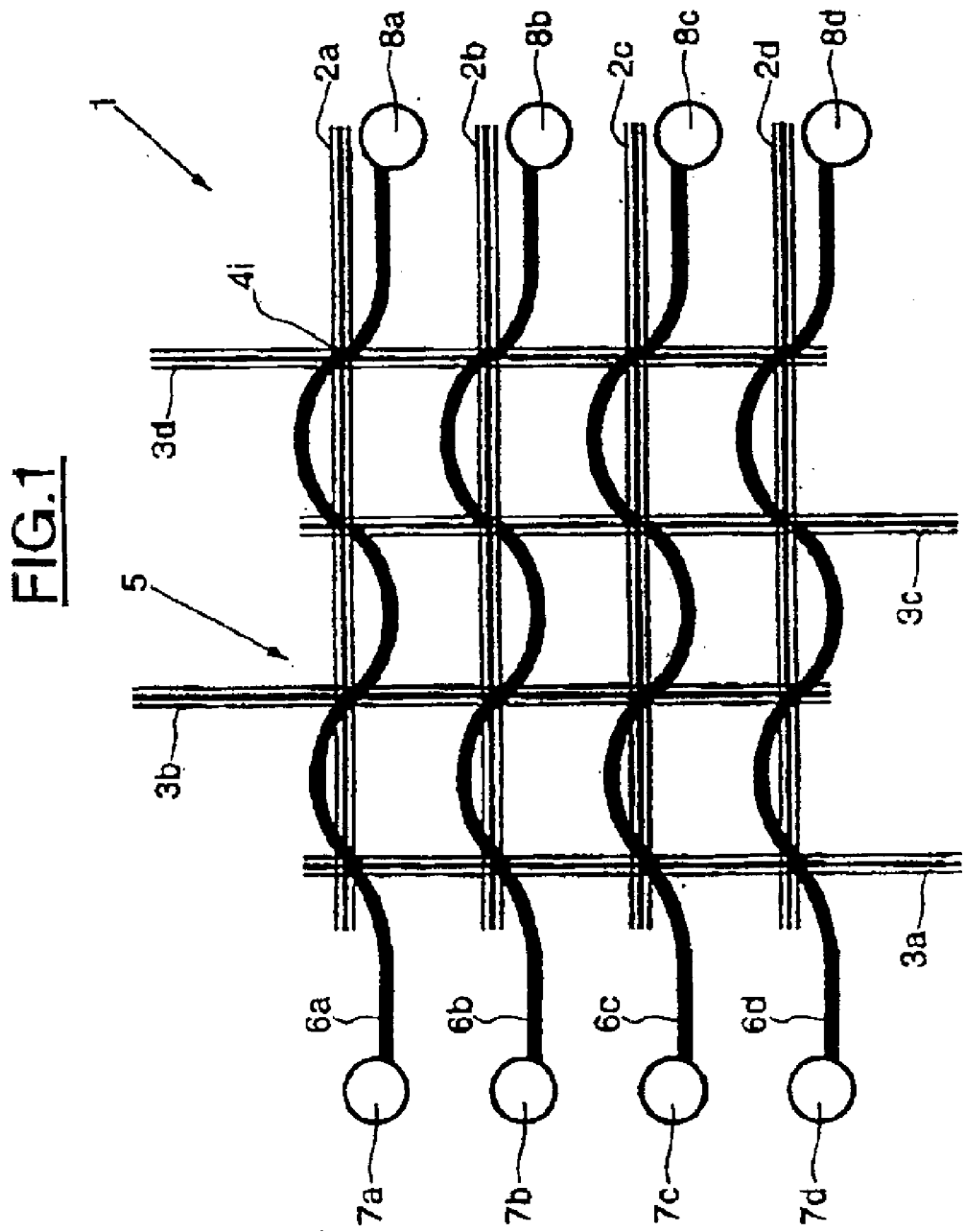
FIG. 1 shows a schematic top view of an optical device according to the present invention.

FIG. 1 shows an optical device of integrated structure that comprises four longitudinal optical microguides 2a, 2b, 2c and 2d and four transverse optical microguides 3a, 3b, 3c and 3d that intersect the four longitudinal guides 2a14 2d orthogonally at sixteen junction regions 4i that constitute a matrix 5.

In one variant, the longitudinal optical microguides 2a, 2b, 2c and 2d and the transverse optical microguides could make angles between them that are substantially different from 90 degrees, at least in the vicinity of the junction regions 4i.

The optical device 1 includes four corrugated routing grooves 6a, 6b, 6c and 6d that respectively pass through, by intersecting them, the junction regions 4i formed in the longitudinal microguides 2a, 2b, 2c and 2d, the ends of which grooves run, on each side of the transverse sides of the matrix 5, on the one hand, into reservoirs 7a, 7b, 7c and 7d and, on the other hand, into reservoirs 8a, 8b, 8c and 8d.

The way in which the groove 6a and the associated reservoirs 7a and 8a can be used will now be described more particularly with reference to FIG. 2, it being possible for the other grooves 6b, 6c and 6d, the other associated reservoirs 7b, 7c and 7d and the other associated reservoirs 8b, 8c and 8d to be used in the same way.

Figure 2:
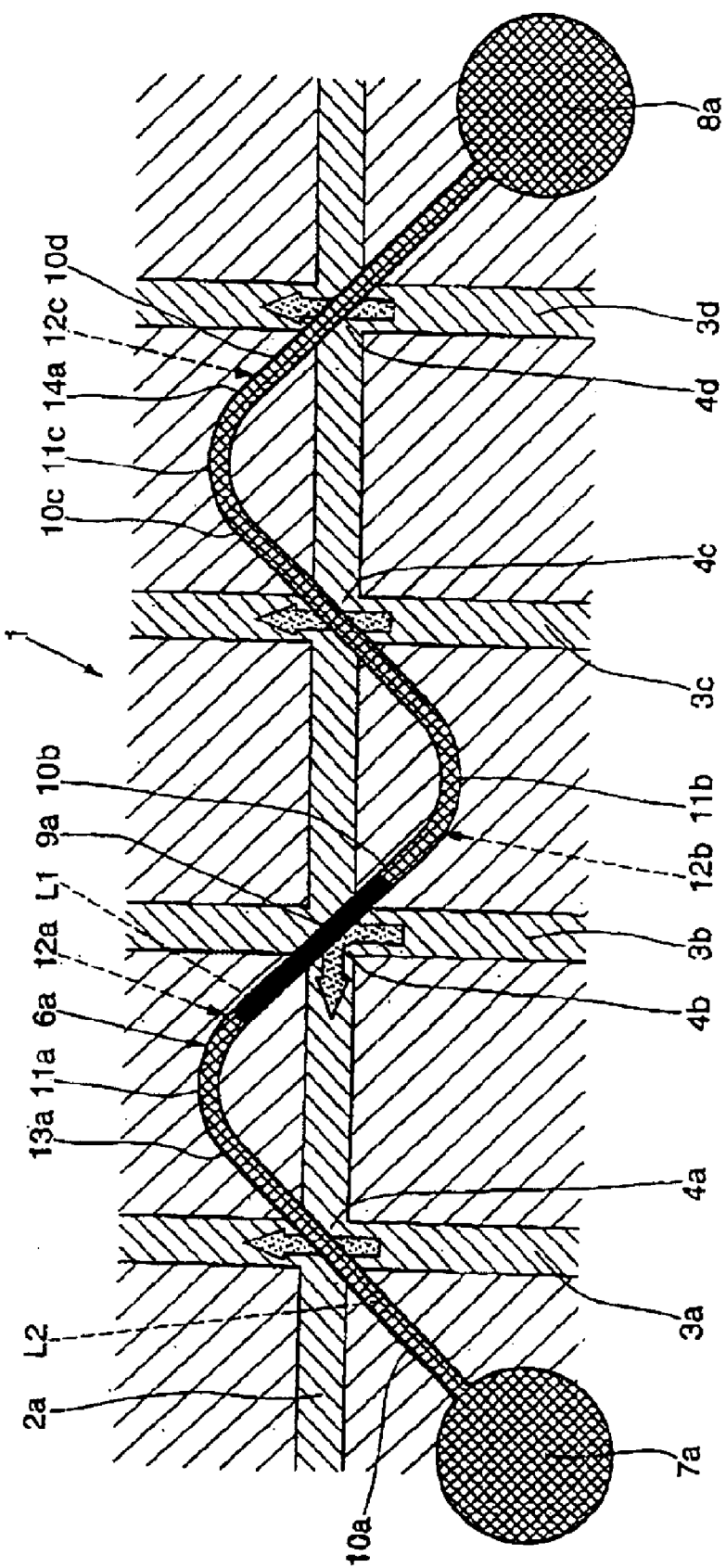
FIG. 2 shows a more detailed top view of part of the optical device of FIG. 1.

As may be seen in this FIG. 2, the groove 6a comprises four straight branches 10a, 10b, 10c and 10d that pass through the junctions 4a, 4b, 4c and 4d, at the middle of them, at 45° to the longitudinal microguide 2a, the successive branches lying perpendicular to each other and being joined by arcs 11a, 11b and 11c.

The branches 10a and 10b and the arc 11a describe a V 12a with a rounded tip. The branches 10b and 10c and the arc 11b describe a V 12b with a rounded tip. The branches 10c and 10d and the arc 11c describe a V 12c with a rounded tip. The rounded tips 11a and 11c of the Vs 12a and 12c are located on one side of the optical microguide 2a. The reservoirs 7a and 8a and the rounded tip of the V 12b are located on the other side of this optical microguide 2a.

The groove 6a contains a segment 9a of a main fluid L1 that fills its entire cross section, this segment being formed by a microdrop of this main liquid L1. A secondary fluid L2 fills the reservoirs 7a and 8a and the parts 10a and 10b of the groove 6a, on each side of the segment 9a of the main fluid L1. The fluids L1 and L2 in the groove 6a thus constitute a fluid section.

The length of the segment 9a of the main fluid L1 is greater than the lengths of the portions of the groove 6a that pass through the junctions 4a, 4b, 4c and 4d but less than the length of each of the Vs 12a, 12b and 12c formed on either side of the longitudinal microguide 2a.

By varying the quantities of secondary fluid L2 that are contained in the reservoirs 7a and 8a in an opposed manner, it is possible to vary, in a corresponding and opposed manner, the quantities of the secondary fluid L2 contained in the parts 10a and 11a of the groove 6a in order thus to make the segment 9a of the main fluid L1 and of the secondary fluid L2 move correspondingly along the groove 6a.

It follows from the above that it is possible to move the segment 9a of the main fluid L1 in order to place it selectively astride each of the junctions 4a, 4b, 4c and 4d.

The main fluid L1 is a material capable of selectively deflecting the waves to be transmitted.

According to one embodiment, the main fluid L1 may be chosen in such a way that its refractive index is less than that of the transmission cores of the optical microguides 2a–d and 3a–d. In addition, the refractive index of the fluid L1 and that of the transmission cores of the optical microguides are such that an optical wave arriving via one of the optical microguides and encountering the interface between the wall of the groove 6a and the segment 9a of the fluid L1 installed in the corresponding junction 4i undergoes total reflection into the other optical microguide of this junction. As examples, the main fluid L1 may be any gas or a liquid such as water.

According to another embodiment, the main fluid may be such that the optical wave, arriving via one of the optical microguides and encountering the interface between the wall of the groove 6a and the segment 9a of the fluid L1 installed in the corresponding junction 4i, undergoes specular reflection. As examples, the fluid L1 may be a liquid metal such as gallium or mercury.

The secondary fluid L2 is chosen in such a way that it is transparent to the optical waves to be transmitted, that is to say its refractive index is equal or close to that of the transmission cores of the optical microguides 2a–d and 3a–d. As examples, the secondary fluid L2 may be a liquid such as toluene, xylene or propylene carbonate.

The following propagation modes may then be obtained.

When, for example, the segment 9a of the main fluid L1 is placed astride the junction 4b, as shown in FIG. 2, an optical wave arriving in this junction 4b via the transverse optical microguide 3b, on one side or the other, may be deflected, by reflection off the corresponding wall of the groove 6a, by the segment 9a of the main fluid L1 into the longitudinal optical microguide 2a, on one side or the other.

Symmetrically, an optical wave arriving in the junction 4b via the longitudinal optical microguide 2a, on one side or the other, may be deflected, by reflection off the corresponding wall of the groove 6a, by the segment 9a of the main fluid L1 into the transverse optical microguide 3b, on one side or the other.

The optical waves optionally propagating in the other transverse optical microguides 3a, 3c and 3d may pass through the optical microguide 2a via the secondary fluid L2 contained in those portions of the groove 6a that pass through the junctions 4a, 4c and 4d.

By selectively placing the segment 9a of the main fluid L1 astride the junctions 4a, 4c or 4d, equivalent propagation modes will be obtained.

It follows from the above that, by selectively activating the reservoirs 7a–d and/or 8a–d, so as to move the segments of the main fluid L1 and the secondary fluid L2 along the grooves 6a–d respectively, it is possible to use the matrix 5 of junctions 4i in the following manner.

Those parts of the transverse optical microguides 3a and 3c that are located on one side of the matrix 5 and those parts of the transverse optical microguides 3b and 3d that are located on the other side of the matrix may be used as optical wave inputs and, consequently, those parts of the longitudinal optical microguides 2a–d located on one side of the matrix 5 may be used as optical wave outputs after the aforementioned selective deflections of the input optical waves via the selected junctions 4i.

In addition, those parts of the longitudinal and transverse optical microguides opposed to those mentioned above may be used, respectively, as inputs and outputs for optical detection waves, making it possible in particular to locate the positions of the segments of the main fluid L1 in each of the grooves 6a–d.

Figure 3:
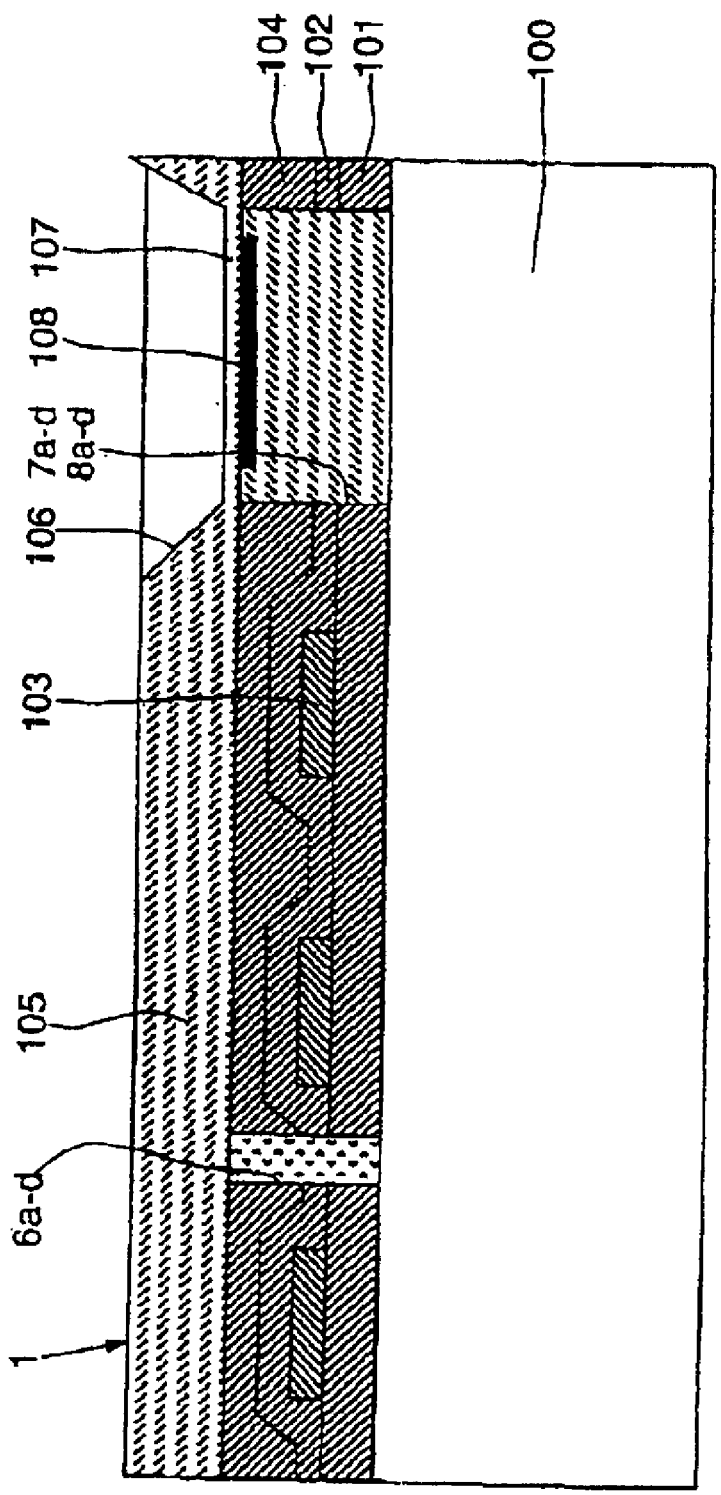
FIG. 3 shows a partial cross section through an optical device of the invention, according to one illustrative example.

In FIG. 3, it may be seen that, in one illustrative example, the optical device 1 comprises a base substrate 100 on which two layers 101 and 102 have been deposited in succession, between which layers the transmission cores 103 of the optical microguides 2a–d and 3a–d have been produced, and an upper planarization layer 104.

In one illustrative example, the base substrate 100 is made of silicon, the layers 101 and 102 are made of undoped silica, the transmission cores 103 are made of doped silica, of silicon nitride, of silicon oxynitride or of silicon, and the upper layer 104 is made of silicon oxide.

In the given example, the aforementioned transmission cores, which are coplanar, are of rectangular or square cross section and have dimensions of between 5 and 14 microns. In addition, in order to form the aforementioned optical microguides, the refractive index of the constituent material of their transmission cores 103 is less than the refractive index of the constituent material or materials of the layers 101 and 102 surrounding them.

The grooves 6a–d and the reservoirs 7a–d and 8a–d are produced through the stack of the layers 101, 102 and 104. The width of the grooves 6a–d may be between five and twenty microns and their depth between thirty and forty microns.

The upper layer 104 is furthermore covered with a plate 105, for example adhesively bonded after a groove 6a–d and the reservoirs 7a–d and 8a–d have been filled with the aforementioned fluids L1 and L2. This cover plate 105 has external recesses 106 in the region of the reservoir 7a–d and 8a–d so as to constitute membranes 107. The cover plate 105 is, for example, made of silicon or of a plastic.

According to one illustrative embodiment, shown in FIG. 3, the reservoirs 7a–d and/or 8a–d contain electrical resistance heating elements 108, for example supported by the membranes 107 and connected to controlled means (not shown) that deliver electrical power. By selectively supplying the electrical resistance elements 108, the fluid L1 contained in the reservoirs 7a–d and 8a–d is heated and consequently expanded so as, in this way, to selectively move the fluids contained in the grooves 6a–6d as described above. The membranes can therefore compensate for the variations in volume of the secondary fluid L2. Cooling of the secondary fluid L2, which reduces its volume, may be carried out by dissipation.

According to another alternative embodiment, the membranes 107 may be selectively deformed so as to vary the volumes of the reservoirs 7a–d and/or 8a–d and thus selectively move the fluids contained in the grooves 6a–6d by controlled pumping, that is to say by pushing in one of the reservoirs and/or sucking in the other reservoir.

The desired deformations of the membranes 107 may be achieved by mechanical or pneumatic members controlled by suitable electrical means.

Figure 4:
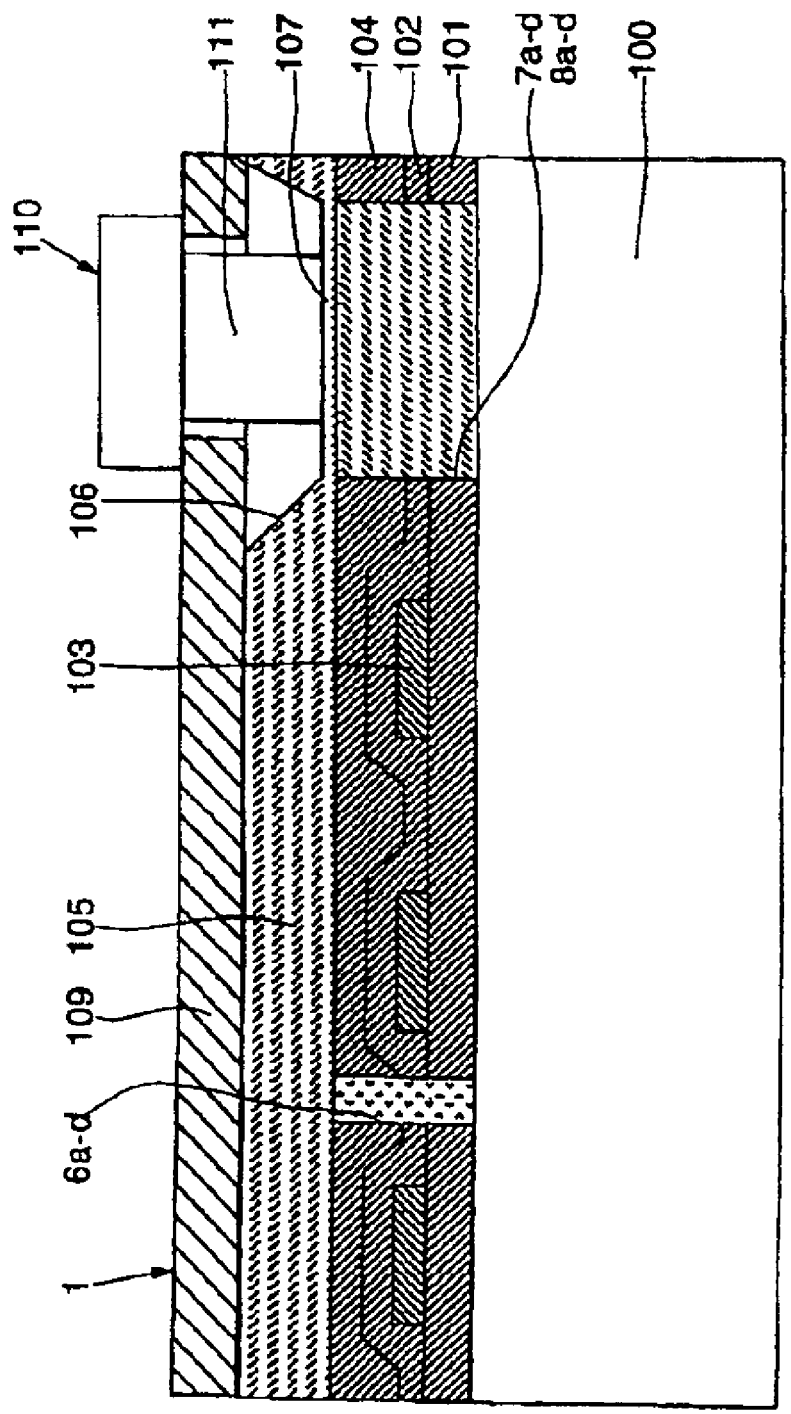
FIG. 4 shows a partial cross section through an optical device of the invention according to another illustrative example.

In the example shown in FIG. 4, a support plate 109 is fixed to the cover plate 105 and carries microcylinders 110 formed by electromagnets, the rods 111 of which are able to act on the membranes 107.

In one example, a capacitive effect could be created between the membranes 107 and the constituent material of the base substrate 100, thereby selectively deforming these membranes.

By virtue of the above arrangements, the means allowing the optical wave propagation modes in the matrix 5 to be selectively driven may be installed or implanted outside this matrix and are limited to one drive per longitudinal line.

In an alternative embodiment, it would be conceivable to provide a third fluid, preferably a liquid, for filling the aforementioned reservoirs, this third liquid not reaching the aforementioned junctions and consequently having no particular optical quality. In particular, this third fluid could be highly expansible/contractile depending on the temperature, so as to cause the aforementioned movements of the fluids L1 and L2 along the aforementioned grooves, it being possible for this third fluid to be, for example, heated by the resistance resistance heating element 108.

The present invention is not limited to the examples described above. Many alternative embodiments are possible without departing from the scope defined by the appended claims.

What is claimed is:

1. An optical device with integrated structure for transporting at least one optical wave, comprising:
   at least one main optical guiding means and at least two secondary optical guiding means to intersect the main guiding means in junction regions;
   a routing groove that passes through said junction regions;
   a fluid section that fills at least one portion of said groove and comprises at least one segment of a main fluid capable of reflecting the optical wave to be transported; and
   means for moving said fluid section along said groove so that the segment of the main fluid is selectively placed astride said junction regions; said routing groove passing through said junction regions in such a way that, when the main segment of the fluid lies astride a selected junction region, the optical wave transported is deflected from the main optical guiding means into the corresponding secondary optical guiding means, or vice versa.

2. The device as claimed in claim 1, wherein said fluid section comprises, at least on one side of said segment of the main fluid, at least one secondary fluid that fills a portion of said groove and is transparent to the optical wave to be transmitted, in such a way that when this secondary fluid lies astride a junction region, the optical wave transported by the corresponding main optical guiding means and/or the corresponding secondary optical guiding means passes through this junction region.

3. The device as claimed in claim 1, further comprising at least one reservoir, into which one end of said groove runs, and means for varying the volume, the pressure and/or the temperature of this reservoir and thus for moving said fluid section along said groove.

4. The device as claimed in claim 3, further comprising a third fluid that fills at least some of said reservoir or reservoirs.

5. The device as claimed in claim 3, wherein said fluid section comprises at least one secondary fluid that fills said reservoir or reservoirs and said groove as far as the segment of the main fluid, this secondary fluid being transparent to the optical wave to be transmitted.

6. The device as claimed in claim 1, wherein said groove extends so as to form a V with a rounded tip, the branches of which V pass through said junction regions.

7. The device as claimed in claim 1, further comprising:
   a multiplicity of main optical guiding means and a multiplicity of secondary optical guiding means that intersect the main guiding means at junction regions, constituting a matrix;
   a multiplicity of routing grooves that pass respectively through the junction regions of the main optical guiding means;

a multiplicity of fluid sections that fill said grooves respectively; and a multiplicity of means for moving said fluid sections respectively, so that the segment of the main fluid of each section is selectively placed astride the corresponding junction regions.

8. The device as claimed in claim 7, wherein each groove extends so as to form successive Vs with alternately opposed rounded tips.

9. The device as claimed in claim 8, wherein those parts of said main optical guiding means and said secondary optical guiding means repsectively, located on each side of said matrix, constitute, alternatively, means for transporting optical waves and means for transporting waves for detecting the position of said segments of the main fluid, whereas those parts of said secondary optical guiding means and said main optical guiding means respectively, located on either side of said matrix, constitute means for transporting optical waves and means for transporting waves for detecting the position of said segments of the main fluid, respectively.

10. The device as claimed in claim 7, wherein those parts of said main optical guiding means and said secondary optical guiding means respectively, located on each side of said matrix, constitute, alternatively, means for transporting optical waves and means for transporting waves for detecting the position of said segments of the main fluid, whereas those parts of said secondary optical guiding means and said main optical guiding means respectively, located on either side of said matrix, constitute means for transporting optical waves and means for transporting waves for detecting the position of said segments of the main fluid, respectively.

11. The device as claimed in claim 1, wherein said means for moving said fluid section comprise means for heating at least one part of said fluid section.

12. The device as claimed in claim 1, further comprising a base layer carrying at least two layers, between which layers the transmission cores of said optical guiding means are formed, and a cover plate, said groove, or alternatively said groove and said reservoir or reservoirs, being formed between said base layer and said cover plate.

13. The device as claimed in claim 12, wherein said cover plate includes at least one membrane located above at least one reservoir.

14. The device as claimed in claim 13, further comprising a support plate that carries means for deforming said membrane.

15. The device as claimed in claim 1, wherein said main fluid comprises a gas or a liquid.

16. The device as claimed in claim 1, wherein said secondary fluid comprises a liquid.

17. The device as claimed in claim 1, further comprising at least two reservoirs, into which the ends of said groove run respectively, and means for varying the volume, the pressure and/or the temperature of at least one of these reservoirs and thus for moving said fluid section along said groove.

18. The device as claimed in claim 17, wherein said fluid section comprises at least one secondary fluid that fills said reservoir or reservoirs and said groove as far as the segment of the main fluid, this secondary fluid being transparent to the optical wave to be transmitted.

19. The device as claimed in claim 1, wherein said means for moving said fluid section comprises at least one membrane and means for deforming this membrane.

20. The device as claimed in claim 1, wherein said main fluid comprises a metallic liquid.

* * * * *